United States Patent
Hashimoto et al.

(10) Patent No.: US 11,911,805 B2
(45) Date of Patent: Feb. 27, 2024

(54) OPTICAL CONNECTOR CLEANING TOOL AND OPTICAL CONNECTOR CLEANING TOOL ATTACHMENT

(71) Applicants: NTT ADVANCED TECHNOLOGY CORPORATION, Tokyo (JP); SENKO ADVANCED COMPONENTS, INC., Hudson, MA (US)

(72) Inventors: Etsu Hashimoto, Tokyo (JP); Yoshiaki Haga, Tokyo (JP); Kazutoshi Ando, Tokyo (JP); Yohei Omodaka, Marlborough, MA (US)

(73) Assignees: NTT ADVANCED TECHNOLOGY CORPORATION, Tokyo (JP); SENKO ADVANCED COMPONENTS, INC., Hudson, MA (US)

( * ) Notice: Subject to any disclaimer, the term of this patent is extended or adjusted under 35 U.S.C. 154(b) by 318 days.

(21) Appl. No.: 17/425,652

(22) PCT Filed: Jan. 22, 2020

(86) PCT No.: PCT/JP2020/002099
§ 371 (c)(1),
(2) Date: Jul. 23, 2021

(87) PCT Pub. No.: WO2020/153397
PCT Pub. Date: Jul. 30, 2020

(65) Prior Publication Data
US 2022/0088645 A1   Mar. 24, 2022

(30) Foreign Application Priority Data
Jan. 25, 2019 (JP) .................. 2019-010988

(51) Int. Cl.
*B08B 1/00* (2006.01)
*G02B 6/36* (2006.01)
*B08B 1/04* (2006.01)

(52) U.S. Cl.
CPC ............. *B08B 1/04* (2013.01); *B08B 1/001* (2013.01); *G02B 6/36* (2013.01)

(58) Field of Classification Search
None
See application file for complete search history.

(56) References Cited

U.S. PATENT DOCUMENTS

| | | | |
|---|---|---|---|
| 8,266,755 B2 * | 9/2012 | Nakane | G02B 6/3866 15/210.1 |
| 9,134,485 B2 * | 9/2015 | Fujiwara | G02B 6/3866 |

(Continued)

FOREIGN PATENT DOCUMENTS

| | | |
|---|---|---|
| JP | 07-020352 A | 1/1995 |
| JP | 2002-277681 A | 9/2002 |

(Continued)

OTHER PUBLICATIONS

CS Connector Specification, "Specification for CS Connector", Rev 1.0, Available Online at <URL: http://www.qsfp-dd.com/wp-content/uploads/2017/09/CS-Connector-Specification-Rev-1.0-TN-Final-2.pdf>, Sep. 18, 2017, 8 pages.

(Continued)

*Primary Examiner* — Rhonda S Peace
(74) *Attorney, Agent, or Firm* — WOMBLE BOND DICKINSON (US) LLP

(57) ABSTRACT

An optical connector cleaning tool includes a fitting portion (44) fitted in the first or second hole (36, 37) of a connection component (32) into which a compact dual core optical connector is fitted on one end side and a cleaning medium (45) projecting from the fitting portion (44). The fitting (Continued)

portion (44) is formed to have a shape by which the fitting portion (44) is fitted in the first or second hole (36, 37) in each of the first and second postures as postures shifted through 180° with respect to as the center the middle (P2) of a virtual straight line connecting the centers of the two ferrules when viewed from an axial direction of the compact dual core optical connector. The fitting portion (44) contacts one ferrule in a state in which the fitting portion (44) is set in the first posture. The fitting portion (44) contacts the other ferrule in a state in which the fitting portion (44) is set in the second posture. There can be provided an optical connector cleaning tool by which the connection end faces of the compact dual core optical connector having two ferrules in one housing can be cleaned.

4 Claims, 21 Drawing Sheets

(56) References Cited

U.S. PATENT DOCUMENTS

| | | | |
|---|---|---|---|
| 10,338,322 B2 * | 7/2019 | Nakane | G02B 6/3866 |
| 2002/0131748 A1 | 9/2002 | Sato | |
| 2012/0216829 A1 | 8/2012 | Cunningham et al. | |
| 2014/0259481 A1 | 9/2014 | Fujiwara et al. | |
| 2015/0362680 A1 | 12/2015 | Nakane | |
| 2022/0088645 A1 * | 3/2022 | Hashimoto | G02B 6/36 |

FOREIGN PATENT DOCUMENTS

| | | |
|---|---|---|
| JP | 5049350 B2 | 10/2012 |
| JP | 2013-117692 A | 6/2013 |
| JP | 2016-004063 A | 1/2016 |
| JP | 6285069 B1 | 2/2018 |

OTHER PUBLICATIONS

Fujikura, "Optical Connector Cleaners including LC duplex cleaners", Search Online at <http://www.fujikura.co.jp/eng/products/optical/opticalconnectors/02/2050083_12918.html>, Searched Online on Jan. 8, 2019, 7 pages.

International Electrotechnical Commission, "Fibre optic interconnecting devices and passive components—Fiber optic connector interfaces—Part 20: Type LC connector family", Specifications of Router Connection Interface for IP Communication Network ISP Connection, 61754-20(C) IEC:2012(E), 2012, 2 pages.

International Preliminary Report on Patentability received for PCT Patent Application No. PCT/JP2020/002099, dated Aug. 5, 2021, 21 pages (14 pages of English Translation and 7 pages of Original Document).

International Search Report and Written Opinion received for PCT Patent Application No. PCT/JP2020/002099, dated Mar. 3, 2020, 25 pages (15 pages of English Translation and 10 pages of Original Document).

Office Action received for Japanese Patent Application No. 2019-010988, dated Mar. 3, 2020, 13 pages (7 pages of English Translation and 6 pages of Office Action).

* cited by examiner

OPTICAL CONNECTOR CLEANING TOOL AND OPTICAL CONNECTOR CLEANING TOOL ATTACHMENT

TECHNICAL FIELD

The present invention relates to an optical connector cleaning tool and an optical connector cleaning tool attachment, which are used to clean the connection end face of an optical connector in a single state or in a state in which the optical connector is inserted into an adapter.

BACKGROUND ART

In many conventional general optical connector cleaning tools, an operator grips the cleaning tool by hand, inserts a projecting portion into an adapter, and wipe the contamination of the connection end face of the optical connector inserted into the adapter by using a cleaning thread exposed at the distal end of the projection portion. An optical connector as the cleaning target of the conventional optical connector cleaning tool is a single core connector. The optical connector cleaning tool is provided with an insertion guide for matching the connection end face of the single core connector with the position of the cleaning thread when inserting the cleaning tool into the adapter.

An optical connector cleaning tool 1 shown in FIG. 26 includes a gripping portion 2 to be gripped by an operator (not shown), a projecting portion 3 assembled to be rotatable with respect to the gripping portion 2, a cleaning thread 4 serving as a cleaning medium exposed at the distal end of the projecting portion 3, and a guide 7 for assisting alignment between the exposed portion of the cleaning thread 4 and the connection end face of an optical connector 6 inserted into an adapter 5 (see FIG. 27). When performing cleaning, as shown in FIG. 27, the distal end of the optical connector cleaning tool 1 is brought into contact with the optical connector 6 in the adapter 5.

When the optical connector 6 is inserted into the adapter 5, a connection end face 11 of the optical connector 6 is located at almost the middle of the adapter 5. When the optical connector cleaning tool 1 is inserted into the adapter 5 in a direction opposite to the optical connector 6, the distal end of the projecting portion 3 faces the connection end face 11 because the size of the guide 7 is appropriately adjusted with respect to the adapter 5. Since the lengths of the projecting portion 3 and the guide 7 are appropriately adjusted also in the insertion direction, the connection end face 11 and the projecting portion 3 are brought into contact with each other at an appropriate pressure via the cleaning thread 4.

As described in, for example, patent literature 1, a cleaning thread supply portion (not shown) around which the cleaning thread 4 is wound and a cleaning thread accommodation portion (not shown) for taking up the used cleaning thread 4 are arranged inside the gripping portion 2. The cleaning thread supply portion and the cleaning thread accommodation portion feed the cleaning thread 4 in synchronism with the cleaning operation of the operator. Therefore, the new cleaning thread 4 always appears at the projecting portion 3.

In an apparatus that performs transmission and reception, two optical fibers are paired and used. In an apparatus of this type, a dual core optical fiber cable in which the pair of optical fibers are integrated is often used. Such a dual core optical fiber cable connector has a shape in which single core connectors are aligned and fixed. The interval between the two aligned single core connectors is standardized. For example, as shown in FIG. 28A, in an LC duplex connector 12 having a structure in which the two LC connectors are aligned, the interval between LC connectors 12a is defined to be 6.25 mm (see non-patent literature 1). To connect the LC duplex connector 12 and another LC duplex connector 12 to each other, an LC duplex connector adapter 13 is used, as shown in FIG. 28B.

This dual core optical fiber cable connector can clean each of the two optical fiber cables using the above-mentioned single core optical connector cleaning tool 1. In recent years, a dual core optical connector cleaning tool is proposed to efficiently clean the dual core optical fiber cable of this type (see non-patent literature 2). This dual core optical connector cleaning tool is shown in FIG. 29. A dual core optical connector cleaning tool 21 includes two cleaning mechanisms (not shown) for the single core optical connector cleaning tool in one gripping portion 22. Each of these cleaning mechanisms includes a guide 23 and a projecting portion 24 projecting from the distal end of the guide 23. A cleaning thread 25 is exposed from the distal end of the projecting portion 24.

The two projecting portions 24 are aligned at an interval standardized for the dual core optical fiber cable connector.

The use number of optical fibers has been dramatically increased with an increase in recent optical communication data, and space-saving optical fibers are demanded. Along with this, an optical connector serving as optical fiber interface is made more compact. The dual core optical connector has been changed from a structure in which two single core connectors are aligned to a connector structure in which two ferrules project from one housing to allow the high-density layout on a transmission apparatus (see non-patent literature 3). As an example of such a structure, a CS connector 31 is shown in FIGS. 30A and 30B, and a CS connector adapter 32 is shown in FIGS. 31A and 31B. As a standard, the CS connector adapter is arranged as one adapter in which the two adapters each shown in FIGS. 31A and 31B are aligned. That is, the structure is adapted such that the two CS connectors 31 can be inserted in one adapter. However, here the adapter 32 corresponding to one CS connector 31 is employed for the descriptive convenience. In the following description, an optical connector having a structure in which two ferrules project from one housing is referred to as simply a "compact dual core optical connector" including the CS connector 31.

The CS connector 31 (compact dual core optical connector) includes a housing 33 fitted in the adapter 32 and two ferrules 34 projecting from this housing 33, as shown in FIGS. 30A and 30B. Connection end faces 35 are formed at the distal ends of the ferrules 34, respectively. The adapter 32 includes first and second holes 36 and 37 fitted on the housing 33 of the CS connector 31 and a communication hole 38 that allows the first and second holes 36 and 37 to communicate with each other, as shown in FIGS. 31A and 31B. The ferrules 34 are inserted into the communication hole 38.

An engaging projection 40 that engages with engaging portions 39 (see FIG. 30B) formed in the housing of the CS connector 31 is arranged in each of the first and second holes 36 and 37 of the adapter 32.

RELATED ART LITERATURE

Patent Literature

Patent Literature 1: Japanese Patent No. 5049350

NON-PATENT LITERATURE

Non-Patent Literature 1: Specifications of Router Connection Interface for IP Communication Network ISP Connection "Fibre optic interconnecting devices and passive components—Fiber optic connector interfaces—Part 20: Type LC connector family, 61754-20(C) IEC:2012(E), ISBN 978-2-88912-982-7

Non-Patent Literature 2: Optical Connector Cleaners including LC duplex cleaners, [online], Fujikura, [search on Jan. 8, 2019], Internet <URL: http://www.fujikura.co.jp/eng/products/optical/opticalconnectors/02/2050083_12918.html>

Non-Patent Literature 3: Specification for CS Connector, Rev 1.0 Sep. 18, 2017, [online], Internet <URL: http://www.qsfp-dd.com/wp-content/uploads/2017/09/CS-Connector-Specification-Rev-1.0-TN-Final-2.pdf>

DISCLOSURE OF INVENTION

Problem to be Solved by the Invention

In the conventional single core optical connector cleaning tool 1, it is difficult to abut the distal ends of the projecting portions against the two ferrules 34 of the CS connector 31 (the compact dual core optical connector) in a state in which the cleaning tool is inserted into the adapter. Therefore, this compact dual core optical connector cannot be cleaned.

In the dual core optical connector cleaning tool 21 shown in FIG. 29, it is difficult to reduce the size of the internal cleaning mechanisms. It is thus difficult to align the interval between the two projecting portions 24 with the narrow interval between the ferrules of the compact dual core optical connector.

It is an object of the present invention to provide an optical connector cleaning tool and an optical connector cleaning tool attachment, which can clean the connection end face of the compact dual core optical connector having two ferrules in one housing.

Means of Solution to the Problem

In order to achieve the above object according to the present invention, there is provided an optical connector cleaning tool comprising a fitting portion configured to be fitted in a hole defined by a connection component, on one end side of which a compact dual core optical connector having two ferrules in a housing is fitted and on the other end side of which the hole is formed such that connection end faces of distal ends of the two ferrules are exposed in the hole, and a cleaning medium projecting from the fitting portion to contact the connection end face of one of the two ferrules, wherein the fitting portion is formed in a shape that allows the fitting portion to be fitted in the hole in a first posture and a second posture, the fist posture and the second posture being postures rotated 180° from each other the center of a virtual straight line connecting the centers of the two ferrules when viewed from an axial direction of the two ferrules, and the cleaning medium contacts one of the two ferrules in a state in which the fitting portion is fitted in the hole in the first posture and contacts the other of the two ferrules in a state in which the fitting portion is fitted in the hole in the second posture.

According to the present invention, there is provided an optical connector cleaning tool attachment mounted on a rod-shaped guide having a distal end portion at which an optical connector cleaning tool cleaning medium is exposed, comprising a fitting portion configured to be fitted in a hole defined by a connection component, on one end side of which a compact dual core optical connector having two ferrules in a housing is fitted and on the other end side of which the hole is formed such that connection end faces of distal ends of the two ferrules are exposed in the hole, and a through hole formed in the fitting portion through which a distal end portion of the guide extends in a fitted state, wherein the fitting portion is formed in a shape that allows the fitting portion to be fitted in the hole in a first posture and a second posture, the fist posture and the second posture being postures rotated 180° from each other the center of a virtual straight line connecting the centers of the two ferrules when viewed from an axial direction of the two ferrules, and the cleaning medium that is exposed at the distal end portion of the guide contacts one of the two ferrules in a state in which the fitting portion is fitted in the hole in the first posture and contacts the other of the two ferrules in a state in which the fitting portion is fitted in the hole in the second posture.

Effect of the Invention

Since the optical connector cleaning tool attachment according to the present invention is used such that one cleaning mechanism having the cleaning medium is rotated through 180° with respect to the middle between the two ferrules. Even if the interval between the ferrules is narrow, the connection end faces of the two ferrules can be reliably cleaned.

According to the present invention, there can therefore be provided an optical connector cleaning tool and an optical connector cleaning tool attachment, which can clean the connection end face of the compact dual core optical connector having two ferrules in one housing.

BEST MODE FOR CARRYING OUT THE INVENTION

Figure 1:
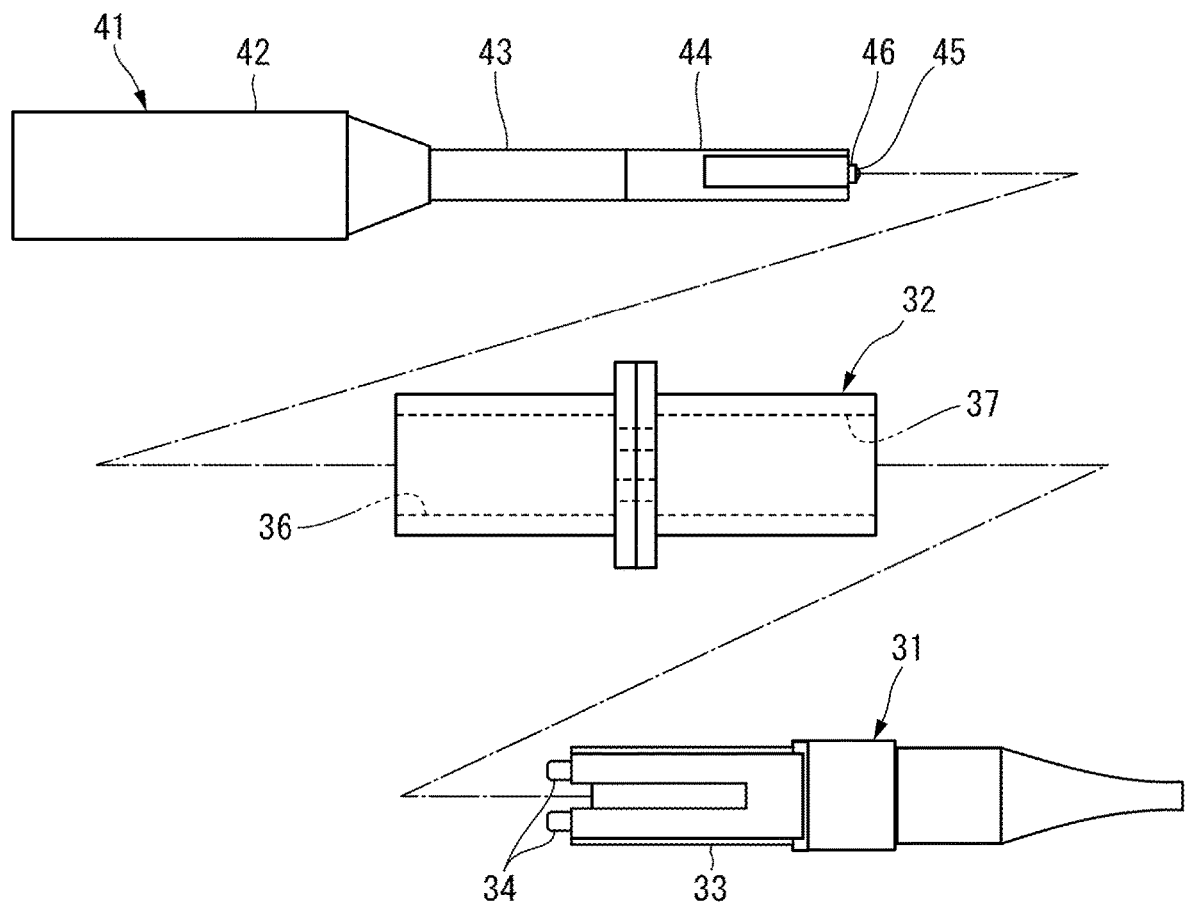
FIG. 1 is a side view of an optical connector cleaning tool, a connector, and an adapter according to the present invention.

An optical connector cleaning tool according to an embodiment of the present invention will be described in detail with reference to FIGS. 1 to 25B. In these drawings, the same reference numerals denote the same or equivalent members described with reference to FIGS. 26 to 31B, and a detailed description thereof will be omitted. The basic structure of the present invention will first be described with reference to FIGS. 1 to 5. In this embodiment, a CS connector 31 is used to explain a compact dual core optical connector, but the optical connector cleaning tool according to the present invention is not limited to cleaning of the CS connector 31. The optical connector cleaning tool can clean another compact dual core optical connector.

Explanation of Basic Structure

Figure 26:
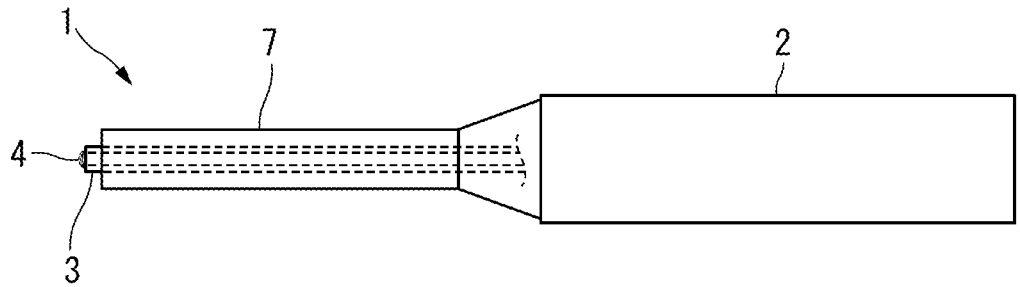
FIG. 26 is a sectional view of a conventional optical connector cleaning tool.
Figure 27:
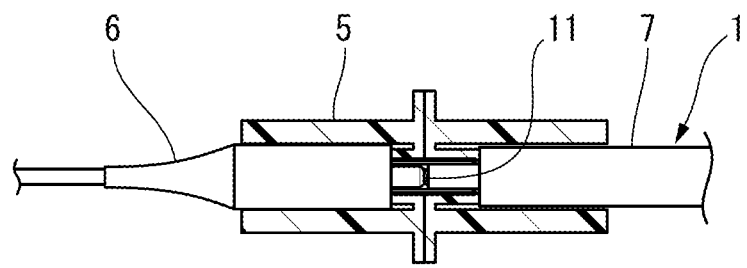
FIG. 27 is a sectional view of a conventional adapter into which the optical connector cleaning tool and the optical connector are inserted.
Figure 28A:
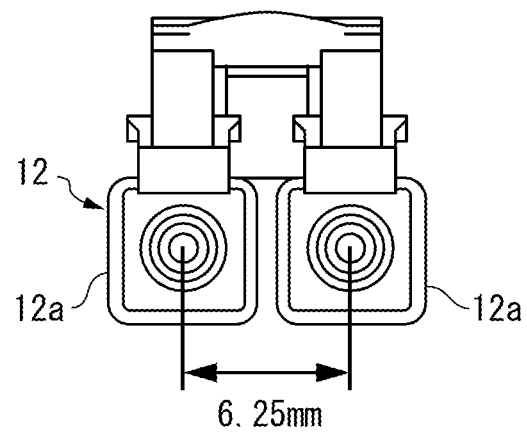
FIG. 28A is a front view of an LC duplex connector for explaining an interval between two conventional optical connectors.
Figure 28B:
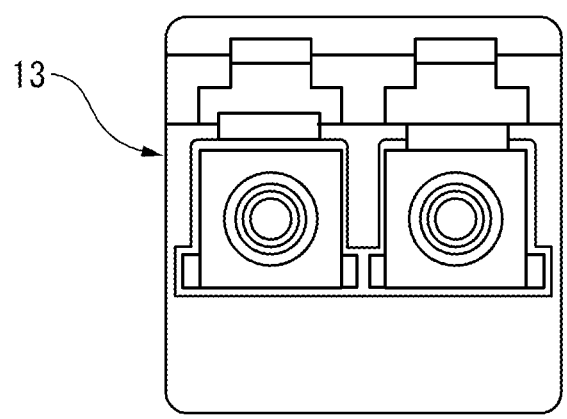
FIG. 28B is a front view of an LC duplex connector for explaining an interval between two conventional optical connectors.
Figure 29:
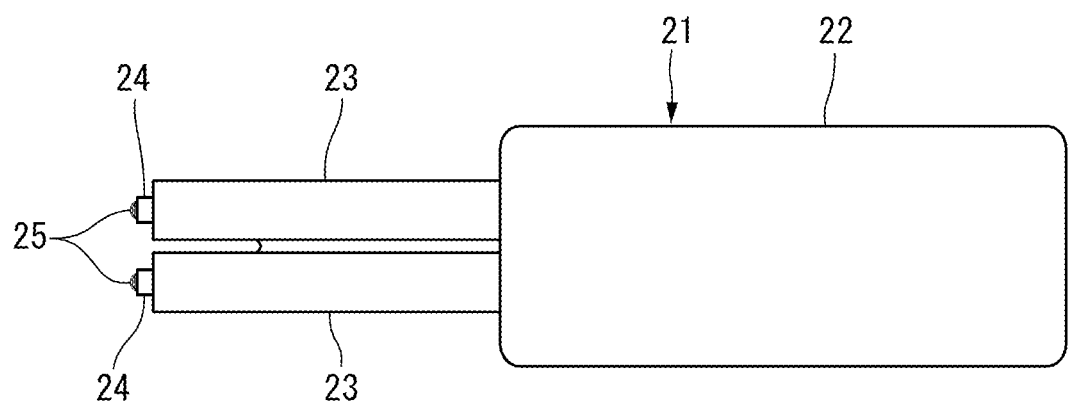
FIG. 29 is a side view of a conventional dual core optical connector cleaning tool.
Figure 30A:
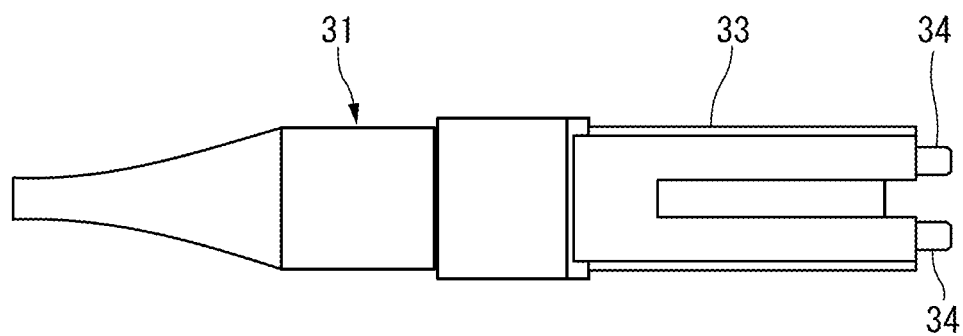
FIG. 30A is a side view showing a CS connector.
Figure 30B:
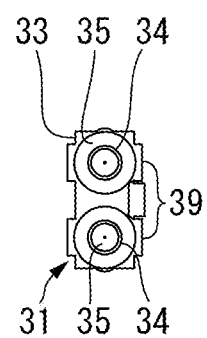
FIG. 30B is a front view showing the CS connector.
Figure 31A:
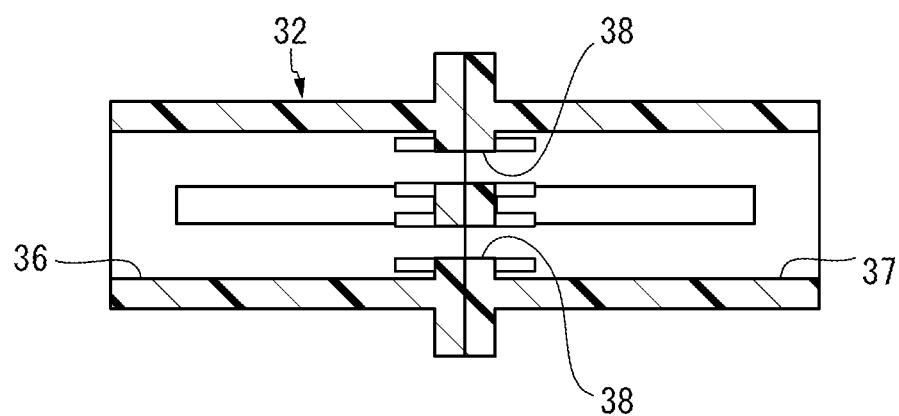
FIG. 31A is a sectional view sowing a CS connector adapter.
Figure 31B:
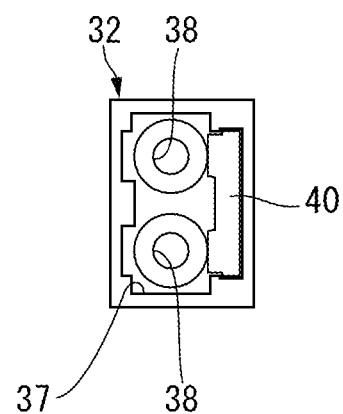
FIG. 31B is a front view showing the CS connector adapter.

An optical connector cleaning tool 41 shown in FIG. 1 includes a gripping portion 42 which is the same as in the conventional optical connector cleaning tool 1 shown in FIG. 26, a guide 43 projecting from the gripping portion 42, a fitting portion 44 arranged at the distal end portion of the guide 43, and a cleaning thread 45 serving as a cleaning medium part of which is exposed at the distal end of the fitting portion 44. The cleaning thread 45 is exposed at the distal end of a projecting portion 46 arranged in the fitting portion.

Figure 2:
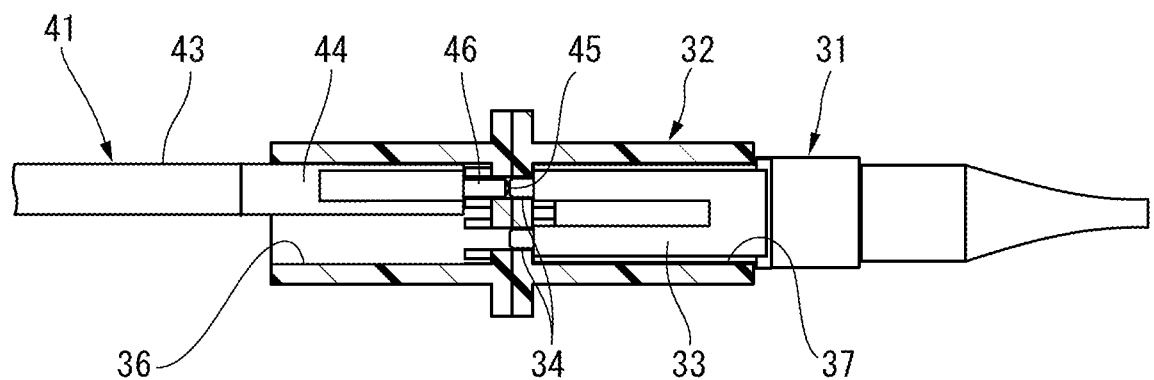
FIG. 2 is a sectional view of the adapter into which the optical connector cleaning tool and a compact dual core optical connector are inserted.

The fitting portion 44 according to this embodiment is formed integrally with the guide 43. As shown in FIG. 2, the fitting portion 44 is formed to be fitted in an adapter 32 (to be described in detail later).

FIG. 2 illustrates the cutaway state of the adapter 32. FIG. 2 shows a state in which the fitting portion 44 and the CS connector 31 (the compact dual core optical connector) are fitted in the adapter 32. In this embodiment, the adapter 32 is equivalent to a "connection component" of the present invention.

A cleaning mechanism (not shown) which is the same as the conventional optical connector cleaning tool 1 is arranged in the gripping portion 42. This cleaning mechanism is arranged such that the cleaning thread 45 projects from the distal end of the fitting portion 44 and is brought into contact with a connection end face 35 of the ferrule 34 at a predetermined pressing force by inserting the fitting portion 44 shown in FIG. 2 and pressing it into a first hole 36 of the adapter 32. The cleaning thread 45 is driven by the cleaning mechanism in this contact state, so that it is folded back at the projecting end and moved to clean the connection end face 35 of the ferrule 34.

The "shape suitable for cleaning the compact dual core optical connector" of the fitting portion 44 will be described in detail with reference to FIGS. 3A to 5.

Figure 3A:
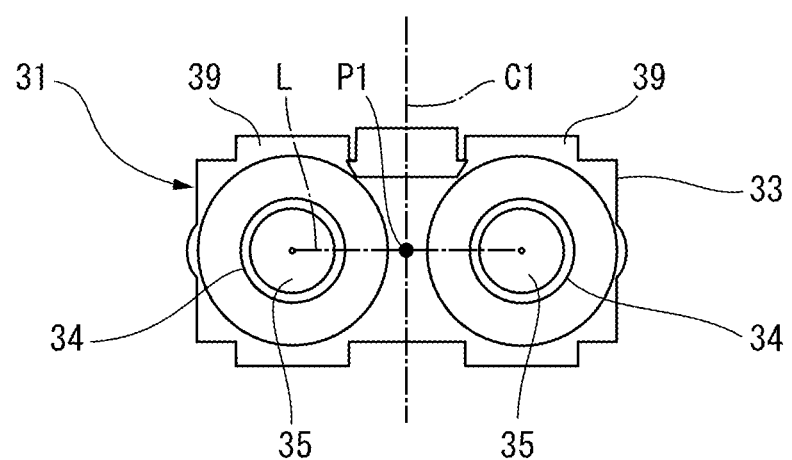
FIG. 3A is a front view of the compact dual core optical connector for explaining a virtual straight line connecting two ferrules.
Figure 3B:
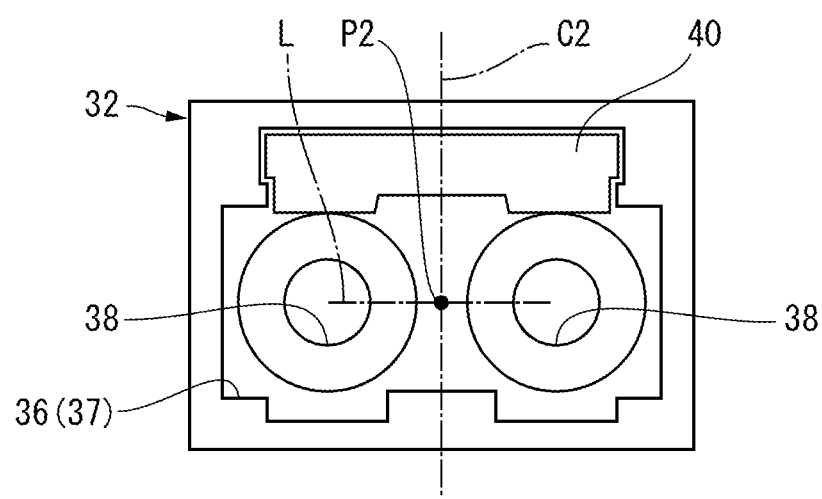
FIG. 3B is a front view of the adapter for explaining a virtual straight line connecting two ferrules.

FIG. 3A is a front view of the CS connector 31, and FIG. 3B is a front view of the CS connector adapter 32. In many dual core optical connectors including the CS connector 31, an almost symmetric structure is employed with respect to a symmetric axis C1 and a symmetric axis C2 along which the two ferrules 34 are arranged line-symmetrically, that is, with respect to the perpendicular bisector with respect to a virtual straight line L connecting the centers of the two ferrules 34.

The optical connector cleaning tool 41 for cleaning the compact dual core optical connector according to the present invention is designed assuming cleaning for such a compact dual core optical connector. The "shape suitable for cleaning the compact dual core optical connector" described above needs to have the following three features.

The first feature is given such that when the fitting portion 44 of the optical connector cleaning tool 41 is inserted into the adapter 32, the cleaning thread 45 is positioned to face the connection end face of one of the ferrules 34 by using a structure such as an inner wall of the adapter 32.

The second feature is a feature of a shape in a depth direction. When the fitting portion 44 of the optical connector cleaning tool 41 is inserted into the adapter 32, an appropriate pressure is applied to the cleaning thread 45.

The third feature is given such that when the fitting portion 44 is rotated through 180° with respect to symmetric centers P1 and P2 serving as the intersections between the virtual straight line L of the centers of the ferrules 34 and the symmetric axes C1 and C2, the cleaning thread 45 projecting from the distal end of the fitting portion 44 is positioned to face the connection end face 35 of the other ferrule 34. Among the first to third features, the first and second features are features which can be obtained even by the conventional optical connector cleaning tool 1. However, the third feature is a feature obtained by the optical connector cleaning tool 41 of the present invention. The optical connector cleaning tool 41 according to the present invention includes the fitting portion 44 having a shape satisfying the first to third features.

In order to implement the first feature, the optical connector cleaning tool 41 of the present invention is formed such that part of the shape of the fitting portion 44 almost matches the shape of the adapter 32. That is, the fitting portion 44 is fitted in, for example, the first hole 36 of the adapter 32, so that the cleaning thread 45 positioned at the distal end of the fitting portion is positioned with respect to the adapter 32 in the vertical and horizontal directions, and the cleaning thread 45 faces the connection end face 35 of one ferrule 34.

Figure 4:
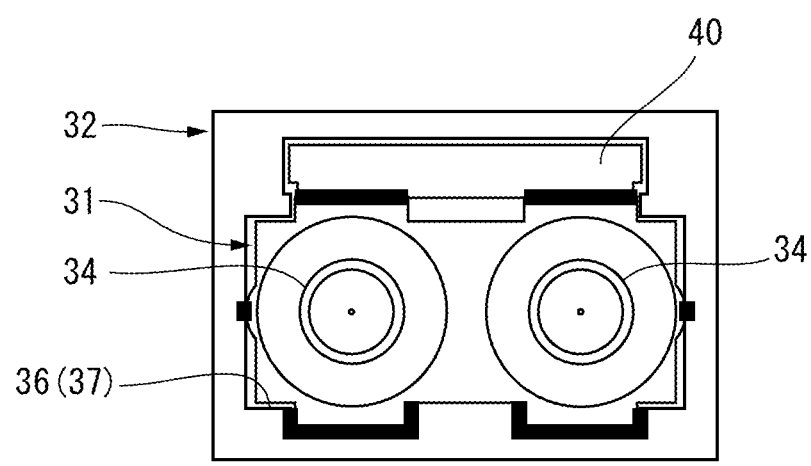
FIG. 4 is a front view showing a state in which the compact dual core optical connector is inserted into the adapter.
Figure 5:
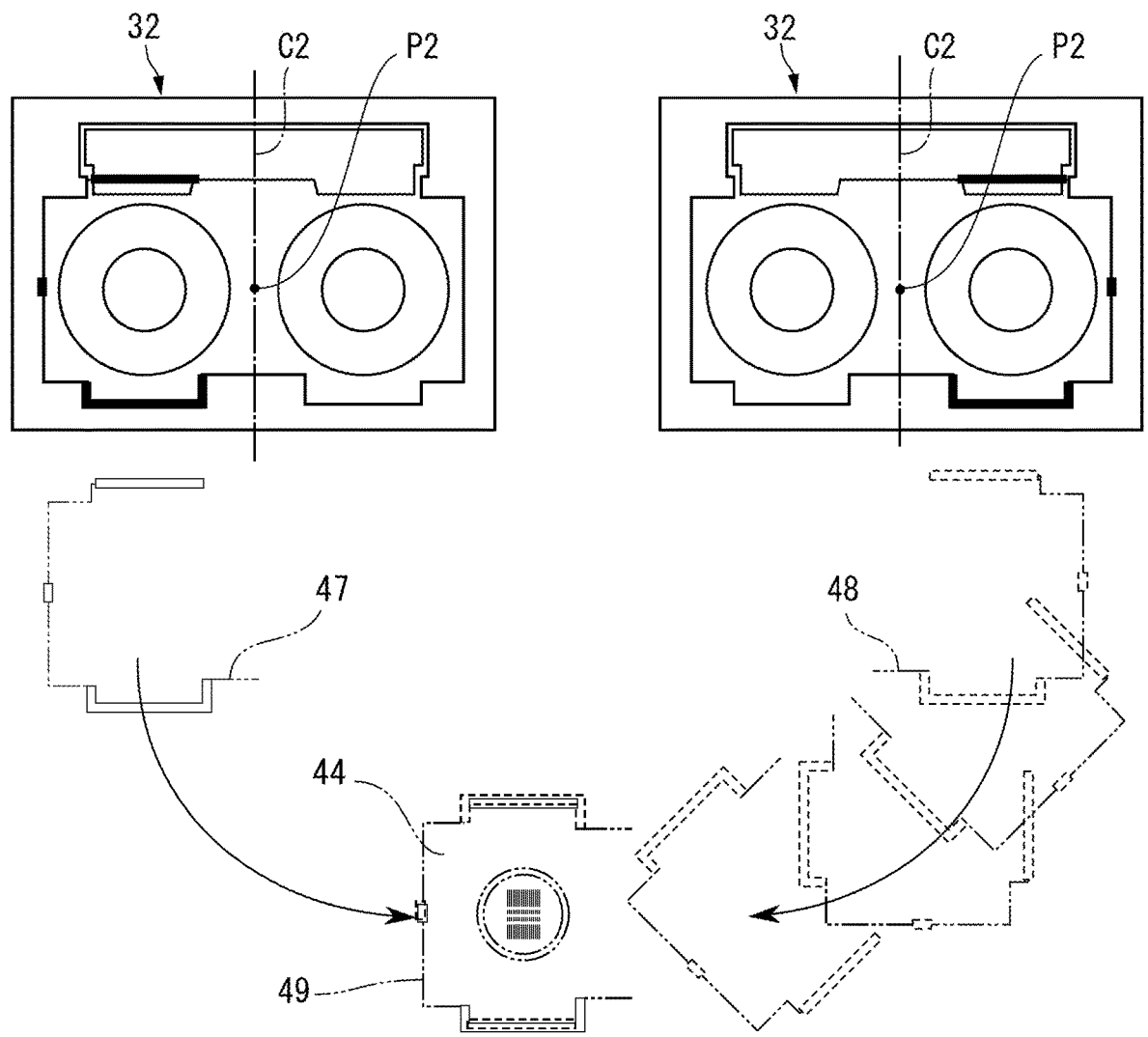
FIG. 5 is a schematic view for explaining the structure of a fitting portion according to the present invention.

Using the CS connector adapter 32 of the CS connector 31 as an example, the inner wall shape of the adapter 32 which is effective for positioning the connector is indicated by thick lines in FIG. 4. FIG. 5 shows the shape of the fitting portion 44 of the present invention which has the shape along the thick lines shown in FIG. 4. Among the two adapters 32 illustrated in FIG. 5, the shape indicated by thick lines in the adapter 32 positioned on the left in FIG. 5 is an example of an edge of the fitting portion 44 required to face one ferrule 34 as the left ferrule. The shape indicated by thick lines in the adapter 32 positioned on the right in FIG. 5 is an example of an edge of the fitting portion 44 required to face the other ferrule 34 as the right ferrule.

In order to implement the third feature described above, if the intersection between the symmetric axis C1 of the ferrule 34 and the virtual straight line L connecting the centers of the ferrules 34 is defined as the symmetric center P2, and the fitting portion 44 is rotated through 180° with respect to this symmetric center P2, the cleaning thread 45 exposed at the distal end of the fitting portion 44 must face the connection end face 35 of the other ferrule 34. For this purpose, the shape obtained by rotating the shape indicated by the thick lines in the adapter 32 on the right side in FIG. 5 is also applied to the fitting portion 44 so as to cause the cleaning thread 45 to face the connection end face 35 of the other ferrule 34 in a state in which the fitting portion 44 is rotated through 180°.

A shape 47 (see FIG. 5) for causing the cleaning thread 45 of the optical connector cleaning tool 41 to face one ferrule 34 and a shape 48 (see FIG. 5) for causing the cleaning thread 45 to face the other ferrule 34 are line symmetric with respect to the symmetric axis C2 of the adapter 32 as the center. For this reason, when the shape 48 for causing the cleaning thread 45 to face the other ferrule 34 is rotated through 180° to overlap the shape 47 for causing the cleaning thread 45 to face one ferrule 34, a shape 49 having the first and third features can be obtained. The shape 49 is a shape having a common portion between the shapes obtained by rotating the shapes 47 and 48 through 180°.

The fitting portion 44 of the optical connector cleaning tool 41 according to the present invention is formed such that the shape 49 having the first and third features is implemented. For this reason, in the first or second posture as a posture obtained by 180° rotation with respect to as the center the middle (the symmetric center P2) of the virtual straight line L connecting the centers of the two ferrules 34 when viewed from the axial direction of the ferrules 34, the fitting portion 44 is fitted in the first hole 36 or the second hole 37 of the adapter 32. The cleaning thread 45 is in contact with the connection end face 35 of one of the two ferrules 34 in a state in which the fitting portion 44 is fitted in the first hole 36 in the first posture. The fitting portion 44 is in contact with the connection end face 35 of the other ferrule 34 in a state in which the fitting portion 44 is fitted in the first hole 36 in the second posture.

In addition, in order to implement the second feature described above, as in the conventional single core optical connector cleaning tool 1, the length (the dimension in the insertion direction) of the optical connector cleaning tool 41 according to the present invention is designed such that, for example, an almost predetermined pressure is applied to the cleaning thread 45 of the distal end portion when inserting the cleaning tool into the adapter 32. Note that since the design of the dimension in the insertion direction is the same as in the conventional single core optical connector cleaning tool 1 shown in patent literature 1, a detailed description thereof will be omitted.

Detailed Embodiment

Next, the detailed embodiment of an optical connector cleaning tool according to the present invention will be described using the CS connector 31 as an example with reference to FIGS. 6A to 8. Note that in the drawings used to explain the detailed embodiment, the same reference numerals denote the same or equivalent members described in FIGS. 1 to 5 and FIGS. 26 to 31B, and a detailed description thereof will be omitted. In these drawings, the fitting portion fitted in the adapter is represented by a hatched region for easy understanding of the position of the fitting portion in the adapter.

First Embodiment

Figure 6A:
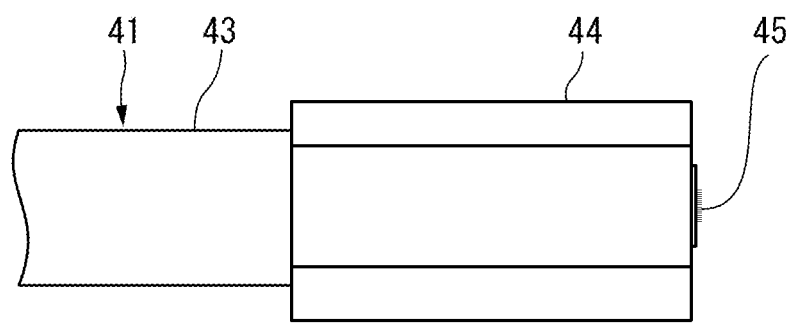
FIG. 6A is a side view showing the main part of an optical connector cleaning tool according to the first embodiment.
Figure 6B:
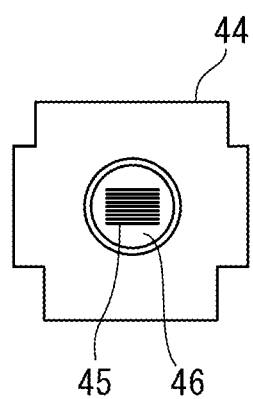
FIG. 6B is a front view showing the main part of an optical connector cleaning tool according to the first embodiment.
Figure 7:
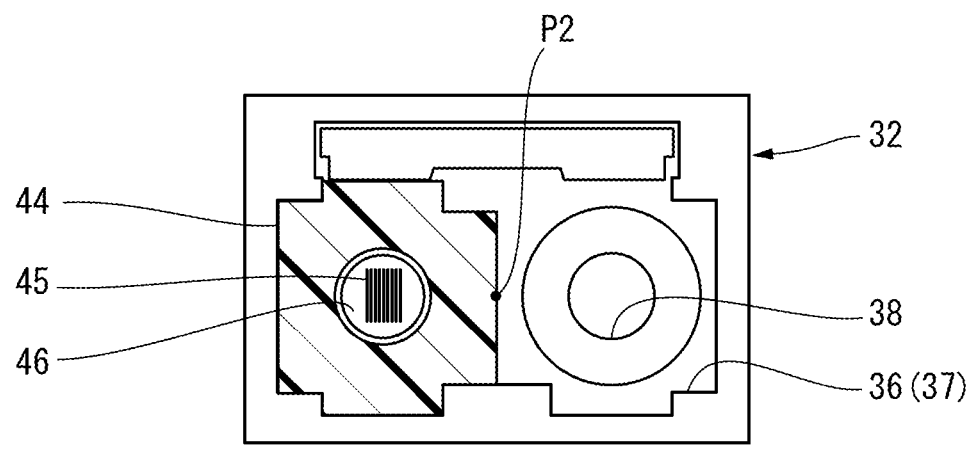
FIG. 7 is a sectional view showing a state in which the fitting portion in the first posture is fitted in the adapter.
Figure 8:
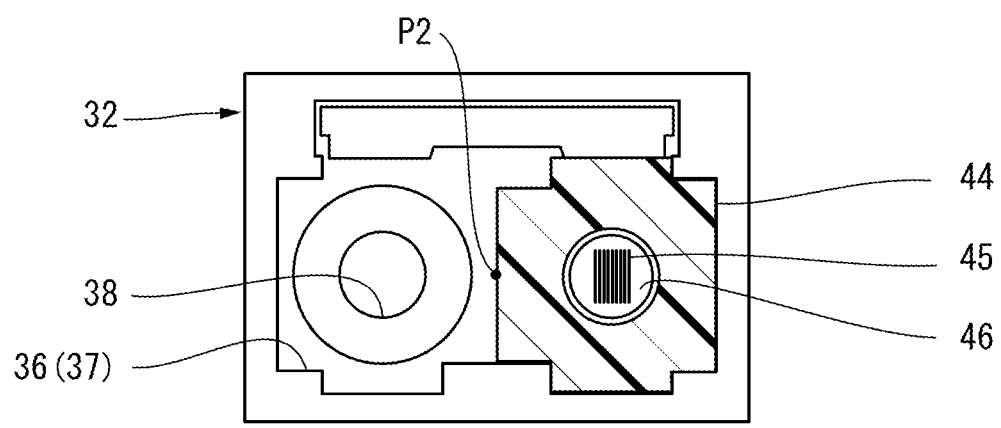
FIG. 8 is a sectional view showing a state in which the fitting portion in the second posture is fitted in the adapter.

FIGS. 6A and 6B show a fitting portion 44 of an optical connector cleaning tool 41 according to the first embodiment. The sectional shape of this fitting portion 44 is the same as a shape 49 having the first and third features described above. FIG. 7 shows a state in which the fitting portion 44 of the optical connector cleaning tool 41 according to the first embodiment is inserted a first hole 36 or a second hole 37 of a CS connector adapter 32 such that a cleaning thread 45 faces one ferrule (left side in FIG. 7). The posture of the fitting portion 44 at this time is the first posture. In addition, FIG. 8 shows a state in which the fitting portion 44 of the optical connector cleaning tool 41 according to the first embodiment is rotated through 180° with respect to a symmetric center P2 of the adapter 32 is inserted into the first hole 36 or the second hole 37 such that the cleaning thread 45 faces the other ferrule (right side in FIG. 8).

In the first embodiment, the fitting portion 44 of the optical connector cleaning tool 41 according to the present invention can be implemented with the distal end shape of a size almost half that of the compact dual core optical connector. That is, the fitting portion 44 is formed in a shape that allows the fitting portion 44 to be accommodated in only the half of the first hole 36 or the second hole 37 of the adapter 32 in a direction where the two ferrule 34 are aligned. By employing this structure, the fitting portion 44 can be limited to a minimum necessary size.

In addition, the optical connector cleaning tool 41 according to this embodiment can selectively clean only the ferrule 34 which requires cleaning. In the dual core optical connector cleaning tool 21 shown in FIG. 29, a trouble occurs because the two ferrules 34 are simultaneously cleaned in one cleaning operation. The trouble will be described using, for example, a dual core optical connector connected to a transceiver. For example, the degree of importance of cleaning for a transmission-side ferrule of the dual core optical connector connected to the transceiver and the degree of importance of cleaning for the reception-side ferrule are different from each other in some cases.

That is, there may be a case in which the transmission-side ferrule is cleaned while reducing the loss as much as possible, and the reception-side ferrule is cleaned to an extent that the transceiver can receive a signal at a reception sensitivity or more. In this case, in the conventional dual core optical connector cleaning tool 21, the reception-side ferrule which does not require cleaning is also cleaned. According to the optical connector cleaning tool 41 of the present invention, the transmission-side ferrule is mainly cleaned, and unnecessary cleaning can be avoided.

Second Embodiment

Figure 9A:
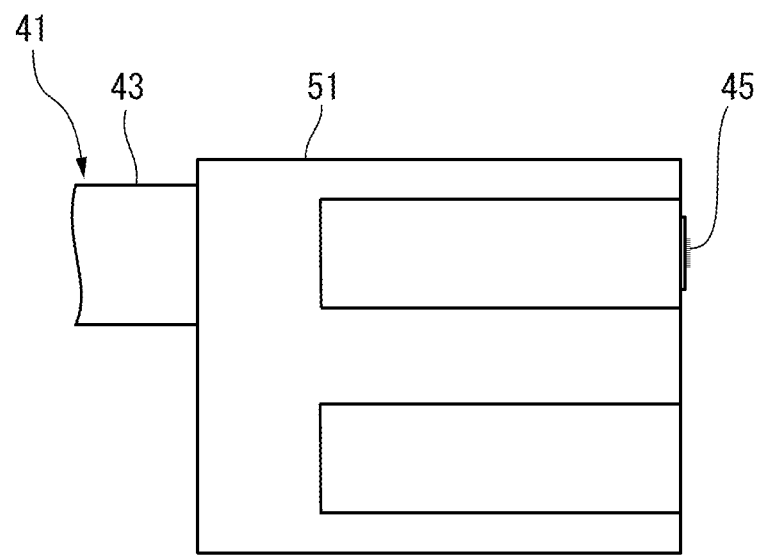
FIG. 9A is a side view showing the main part of an optical connector cleaning tool according to the second embodiment.
Figure 9B:
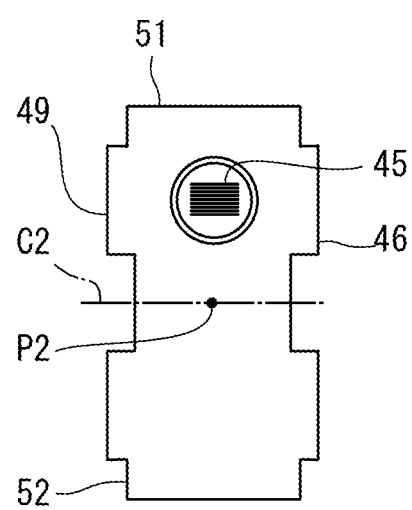
FIG. 9B is a front view showing the main part of an optical connector cleaning tool according to the second embodiment.
Figure 10:
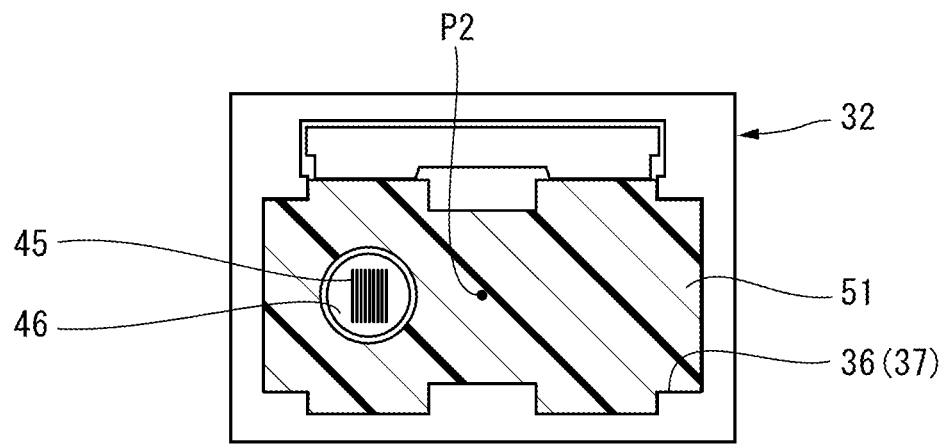
FIG. 10 is a sectional view showing a state in which the fitting portion in the first posture is fitted in the adapter.
Figure 11:
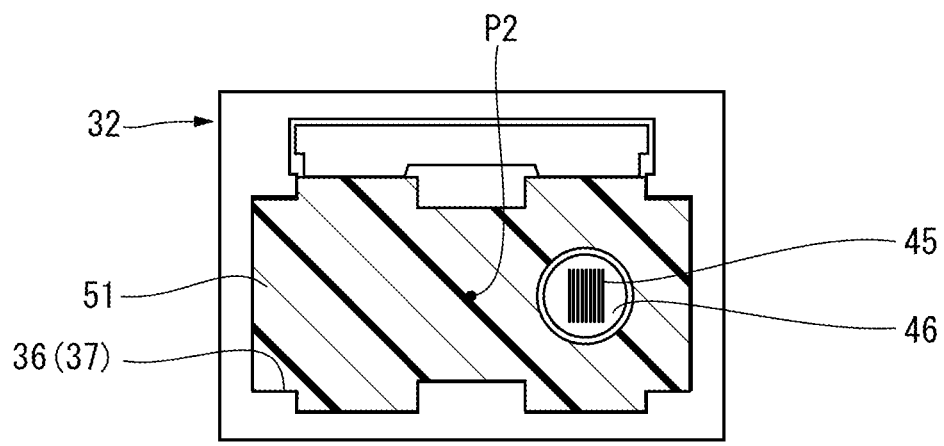
FIG. 11 is a sectional view showing a state in which the fitting portion in the second posture is fitted in the adapter.

A fitting portion of an optical connector cleaning tool according to the present invention can be formed as shown in FIGS. 9A and 9B. The shape of a fitting portion 51 shown in FIGS. 9A and 9B is a shape obtained by connecting, with respect to a symmetric axis C2 of an adapter 32, a shape 49 having the first and third features and a shape 52 obtained by rotating the shape 49 through 180° with respect to a symmetric center P2 of the adapter 32. FIG. 10 shows a state in which the fitting portion 51 in the first posture is inserted into a first hole 36 or a second hole 37 of the adapter 32 so that a cleaning thread 45 faces one ferrule (left side in FIG. 10). In addition, FIG. 11 shows a state in which the fitting portion 51 set in the second posture by 180° rotation about the symmetric center P2 with respect to the first posture shown in FIG. 10 is inserted into the first hole 36 or the second hole 37 of the adapter 32 so that the cleaning thread 45 faces the other ferrule (right side in FIG. 11).

In the second embodiment, the fitting portion 51 has a size almost equal to that of the compact dual core optical connector. That is, the fitting portion 51 is formed in a shape that allows the fitting portion 51 to be accommodated in the first hole 36 or the second hole 37 of the adapter 32 along the entire range of the direction in which two ferrules 34 are aligned. According to this embodiment, although the fitting portion 51 is larger than the fitting portion 44 of the first embodiment shown in FIGS. 7 and 8, an effective portion in alignment in the adapter 32 can be doubled, so that the positioning precision can be improved, the cleaning can be reliably performed, and cleaning reliability can be improved.

Third Embodiment

Figure 12A:
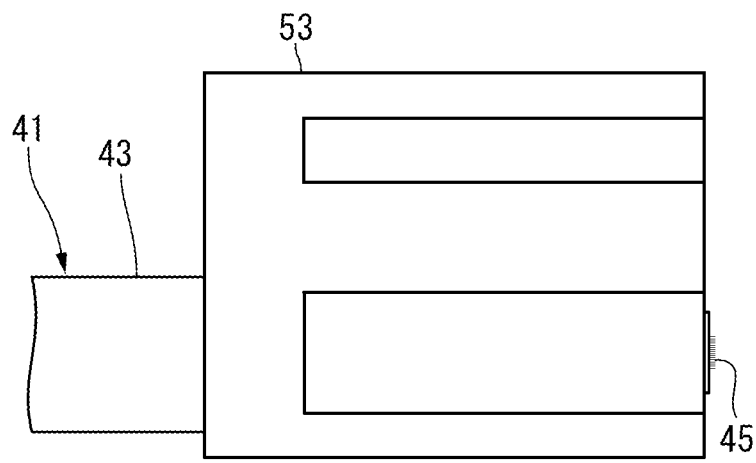
FIG. 12A is a side view showing the main part of an optical connector cleaning tool according to the third embodiment.
Figure 12B:
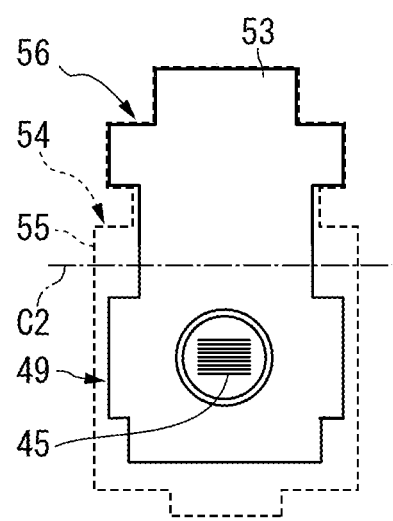
FIG. 12B is a front view showing the main part of an optical connector cleaning tool according to the third embodiment.

A fitting portion of an optical connector cleaning tool according to the present invention can be arranged as shown in FIGS. 12A to 16. FIGS. 12A and 12B show a fitting portion 53 according to the third embodiment. The shape of the fitting portion 53 is a shape obtained by connecting, with respect to a symmetric axis C2, a shape 49 having the first and third features described in FIG. 5 and a shape 56 aligned with part (see FIG. 15) of an insertion port shape 55 of an LC connector adapter 54 (see FIG. 12B). The LC connector adapter 54 is equivalent to an "adapter for connecting a single core optical connector" in the present invention.

Figure 13:
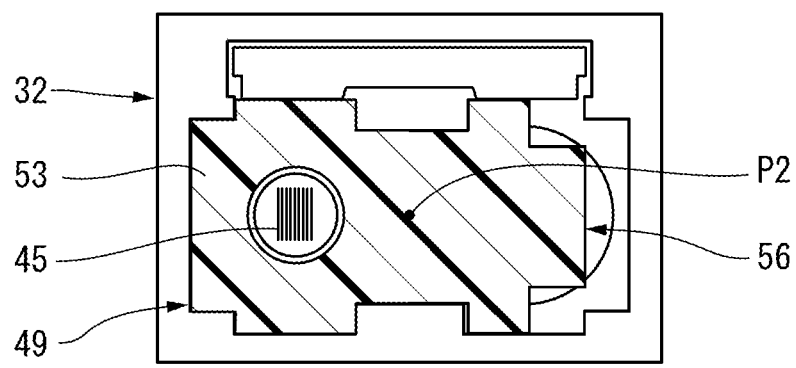
FIG. 13 is a sectional view showing a state in which the fitting portion in the first posture is fitted in the adapter.
Figure 14:
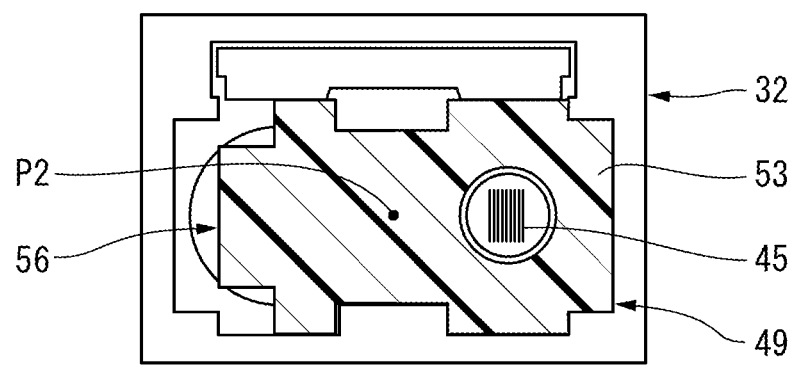
FIG. 14 is a sectional view showing a state in which the fitting portion in the second posture is fitted in the adapter.

FIG. 13 shows a state in which the fitting portion 53 of the third embodiment is inserted into an adapter 32 in the first posture to cause a cleaning thread 45 to face one ferrule (left side in FIG. 13). In addition, FIG. 14 shows a state in which the fitting portion 53 according to the third embodiment is rotated through 180° about a symmetric center P2 of the adapter 32 with respect to the first posture to set the second posture, and the fitting portion 53 is inserted into the adapter 32 to cause the cleaning thread 45 to face the other ferrule (right side in FIG. 14).

Figure 15:
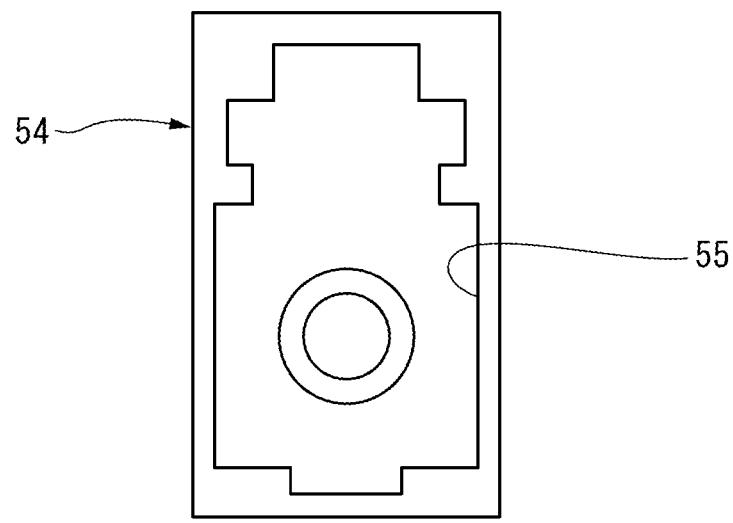
FIG. 15 is a front view of an LC connector adapter.
Figure 16:
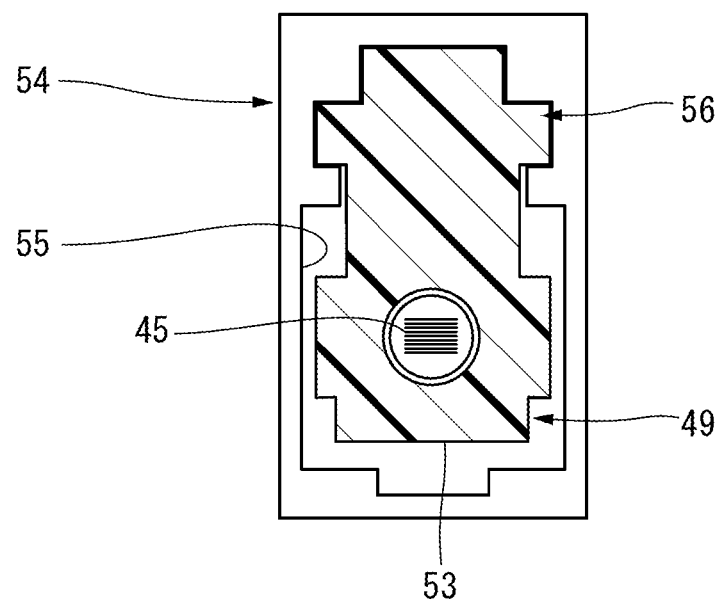
FIG. 16 is a sectional view showing a state in which the fitting portion is fitted in the LC connector adapter.

FIG. 15 is a front view of the LC connector adapter 54. FIG. 16 shows a state in which the fitting portion 53 according to the third embodiment is inserted into this LC connector adapter 54. Since the shape 56 of part of the fitting portion 53 partially matches the insertion port shape 55 of the LC connector adapter 54, the fitting portion 53 is positioned with respect to the LC connector adapter 54, and the cleaning thread 45 matches the position of the ferrule of the LC connector (not shown).

The optical connector cleaning tool 41 according to this embodiment can clean not only the compact dual core optical connector (the CS connector 31), but also another single core optical connector (LC connector).

Fourth Embodiment

In each embodiment described above, the "connection component" according to the present invention is formed by the adapter. However, the "connection component" can be formed by a protection cap 61 attached to an optical connector cleaning tool 41 as shown in FIGS. 17 to 20.

Figure 17:
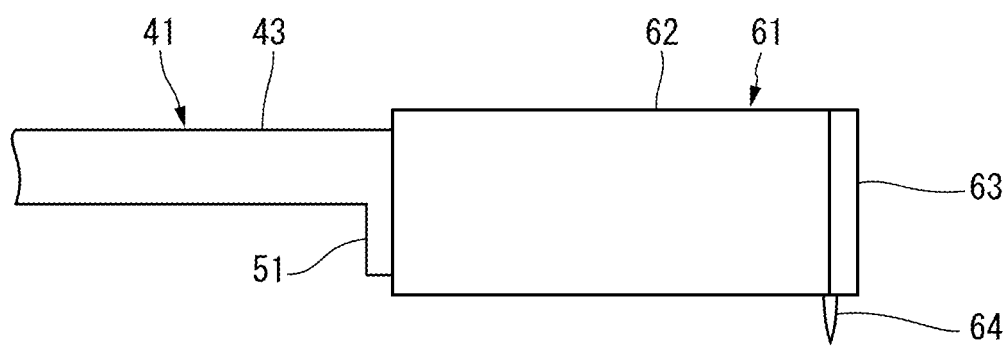
FIG. 17 is a side view showing the main part of an optical connector cleaning tool according to the fourth embodiment.

The protection cap 61 shown in FIG. 17 can prevent contamination of a cleaning thread 45 exposed to the distal end of a fitting portion 51 shown in FIGS. 9A and 9B at the time of storage. The protection cap 61 includes a cap main body 62 detachably attached to the fitting portion 51 and a lid 63. The cap main body 62 and the lid 63 are connected to each other via a hinge 64. Note that the cap is not limited to the one attached to the fitting portion 51. For example, the cap may be attached to a fitting portion having another shape such as a fitting portion 44 shown in FIGS. 6A and 6B and a fitting portion 53 shown in FIGS. 12A and 12B.

Figure 18:
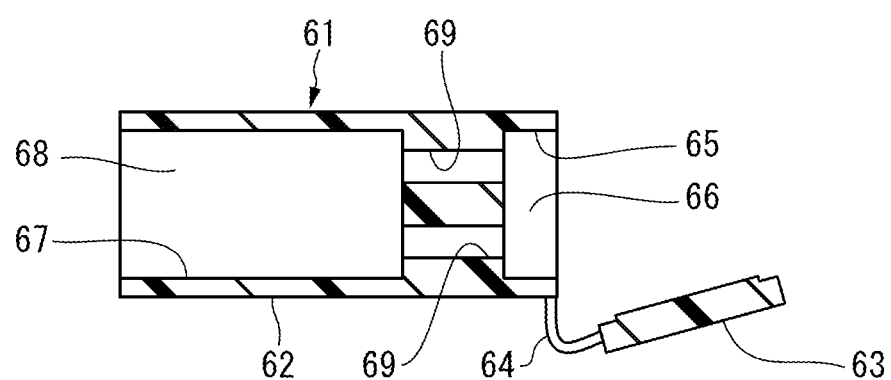
FIG. 18 is a sectional view of a cap.

According to the cap 61, in addition to the protection of the fitting portion by covering it, a CS connector 31 and another compact dual core optical connector are inserted into a third hole 65 (see FIG. 18) by removing the lid 63, so that a single compact dual core optical connector not inserted into the adapter 32 can be cleaned. FIG. 18 shows the section of the cap 61. The cap main body 62 has a first space 66 formed on one end side of the cap main body 62 to accommodate the compact dual core optical connector in a fitted state, a second space 68 formed by a hole 67 open on the other end side to accommodate the fitting portion 51 of the optical connector cleaning tool, and two communication holes 69 for causing the first space 66 and the second space 68 to communicate with each other to receive two ferrules 34.

Figure 19:
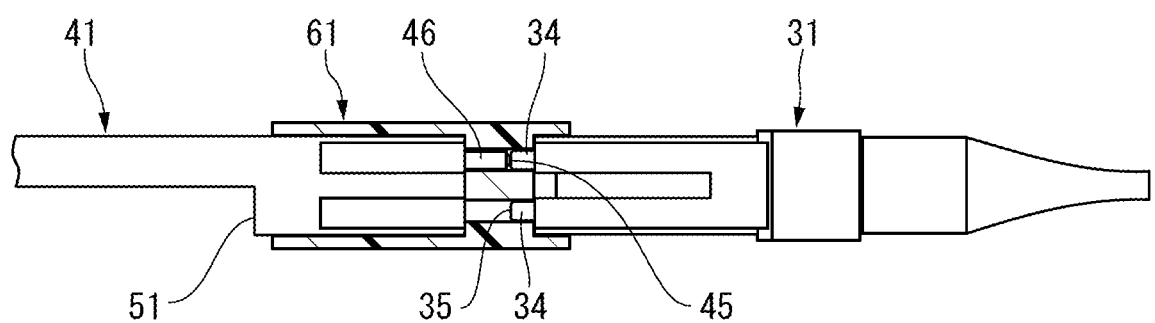
FIG. 19 is a sectional view of the cap into which the optical connector cleaning tool and the optical connector are inserted.

The cap 61 is designed such that the relative position between the compact dual core optical connector and the optical connector cleaning tool 41 inserted into the cap 61 is the same as the relative position between the compact dual core optical connector and the optical connector cleaning tool 41 inserted into the adapter 32 shown in FIGS. 10 and 11. FIG. 19 shows a state in which the optical connector cleaning tool 41 and the CS connector 31 (the compact dual core optical connector) are inserted into the cap 61. When the optical connector cleaning tool 41 is pushed into the cap main body 62, a projecting portion 46 pops up from the fitting portion 51, and a cleaning thread 45 exposed at the distal end of the projecting portion 46 contacts a connection end face 35 of a compact dual core optical connector ferrule 34 at an appropriate pressure.

Figure 20:
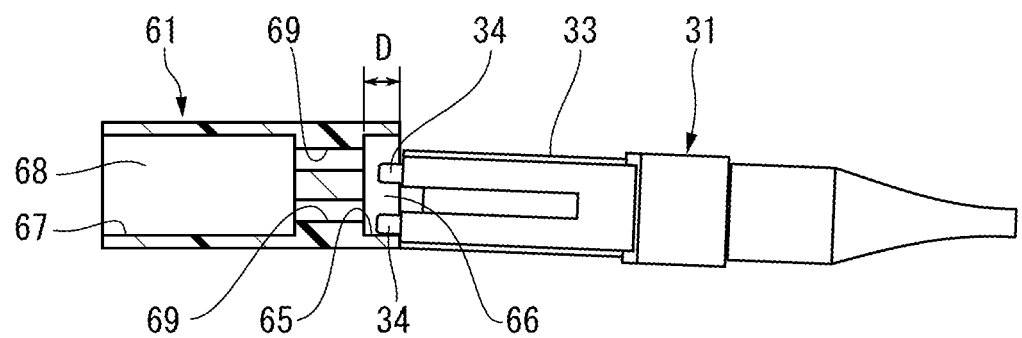
FIG. 20 is a sectional view showing a state in which part of the compact dual core optical connector is inserted into the cap.

The cap 61 according to this embodiment also has a structure which prevents contamination of the distal end of the connector when the compact dual core optical connector is inserted into the cap. FIG. 20 shows an example in which the CS connector 31 (the compact dual core optical connector) is inserted into the cap 61. A depth D of the first space 66 which receives the CS connector 31 is set larger than the length of the ferrule 34 which projects from the housing 33 of the CS connector 31. As a result, as shown in FIG. 20, in a state in which the CS connector 31 is not correctly inserted, the distal end of the ferrule 34 is not brought into contact with the cap 61. Since the third hole 65 (the connector insertion port) of the cap 61 is matched with the size of the CS connector 31, if the CS connector 31 is set at the insertion position, the distal ends of the two ferrules 34 face the two communication holes 69 of the cap 61 which receive the ferrules 34. In this state, when the CS connector 31 is inserted into the cap 61, the distal ends of the ferrules 34 are accommodated in the two communication holes 69 without causing the ferrules 34 to touch any portion of the cap 61. Therefore, the connection end faces 35 can be prevented from contamination before cleaning.

By using the cap 61 of the optical connector cleaning tool 41 described with reference to the fourth embodiment shown in FIGS. 17 to 20, a single compact dual core optical connector which is not inserted into the adapter can be cleaned.

Fifth Embodiment

Figure 21A:
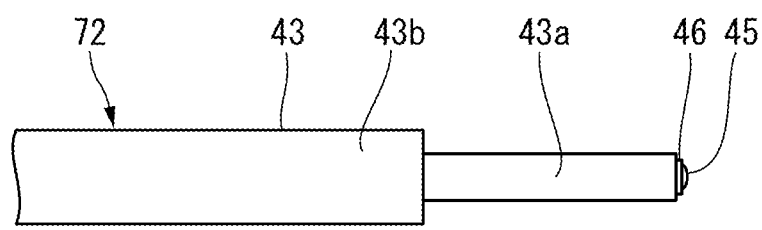
FIG. 21A is a side view of the optical connector cleaning tool from which an attachment is removed.
Figure 21B:
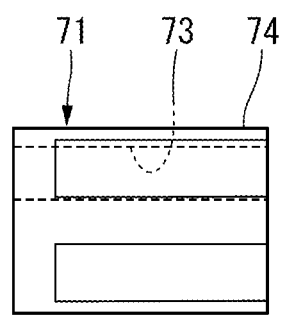
FIG. 21B is a side view of the attachment detached from the optical connector cleaning tool.

A fitting portion according to the present invention can be arranged as shown in FIGS. 21A to 25B. The fitting portion according to this embodiment is arranged as an attachment 71 formed separately from the optical connector cleaning tool. FIGS. 21A and 21B show the structure of the distal end portions of the attachment 71 of this embodiment and an optical connector cleaning tool 72. The optical connector cleaning tool 72 shown in FIG. 21A is different from an optical connector cleaning tool 41 shown in FIG. 1 in the structure of the distal end portion of a guide 43, and the rest is the same as the optical connector cleaning tool 41.

Figure 22A:
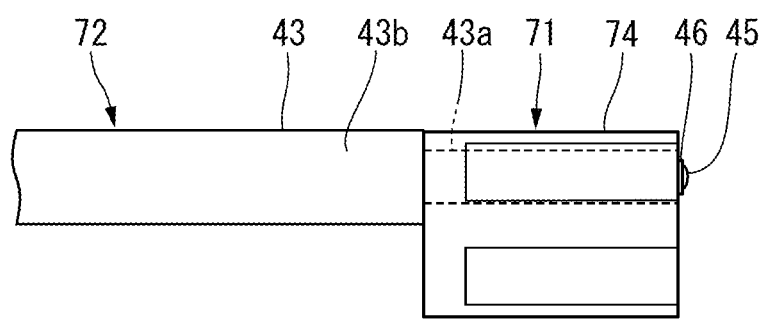
FIG. 22A is a side view showing the attachment attached to the optical connector cleaning tool.
Figure 22B:
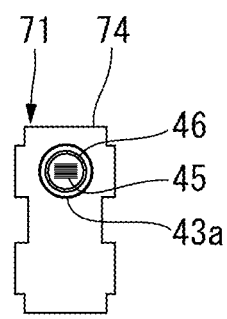
FIG. 22B is a front view showing the attachment attached to the optical connector cleaning tool.

A distal end portion 43*a* of the guide 43 of the optical connector cleaning tool 72 is formed to be thinner than a base portion 43*b* serving as a gripping portion side (not shown). In this embodiment, the distal end portion 43*a* is equivalent to the "rod-shaped guide" of the present invention according to claim 8. The distal end portion 43*a* extends through a through hole 73 formed in the attachment 71 for the CS connector 31 in a fitted state. The attachment 71 according to this embodiment is formed to have the same shape as a fitting portion 51 shown in FIGS. 9A and 9B. When the attachment 71 is mounted with the distal end portion 43*a* of the guide 43, the attachment 71 is equivalent to the fitting portion 51 shown in FIGS. 9A and 9B, as shown in FIGS. 22A and 22B.

That is, the attachment 71 includes a fitting portion 74 which is the same as the fitting portion 51 shown in FIGS. 9A and 9B and the through hole 73 formed in the fitting portion 74. This fitting portion 74 is fitted in the adapter 32 for the CS connector 31 (the compact dual core optical connector) or the hole of the connection component such as the cap 61 shown in FIG. 17.

Figure 23A:
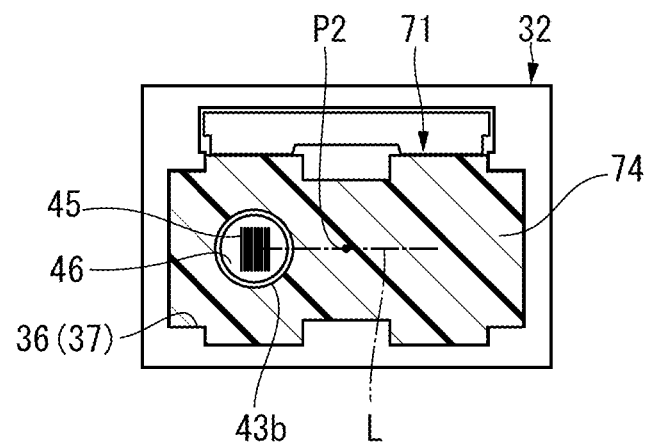
FIG. 23A is a sectional view of the attachment fitted in the adapter in the first posture.
Figure 23B:
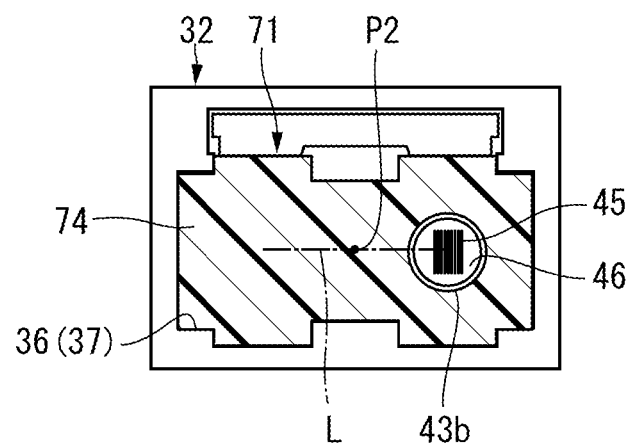
FIG. 23B is a sectional view of the attachment fitted in the adapter in the second posture.

The fitting portion 74 of the attachment 71 is formed in a shape that allows the fitting portion 74 to be fitted in a first hole 36 or a second hole 37 of the adapter 32 (the connection component) in a first posture and a second posture as postures obtained by 180° rotation as the center the middle (a symmetric center P2) of a virtual straight line L connecting the centers of the two ferrules viewed from the axial direction (the axial direction of the ferrule of the compact dual core optical connector) of the optical connector cleaning tool 72, as shown in FIGS. 23A and 23B. A cleaning thread 45 exposed to the distal end portion 43*a* of the guide 43 contacts one of the two ferrules in a state in which the fitting portion 74 is fitted in the first hole 36 or the second hole 37. In addition, the cleaning thread 45 contacts the other ferrule in a state in which the fitting portion 74 is fitted in the first hole 36 or the second hole 37 in the second posture.

Figure 24:
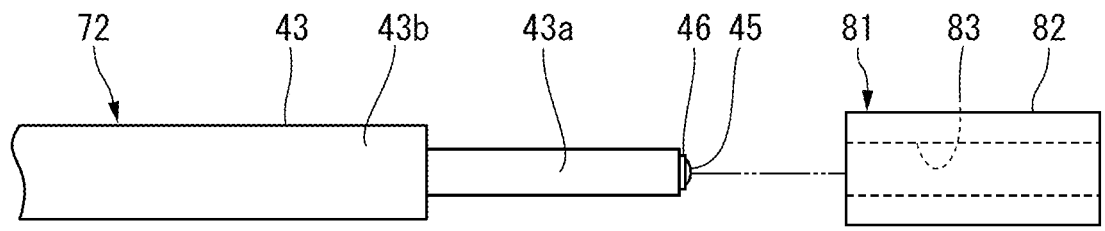
FIG. 24 is a side view of an LC connector attachment detached from the optical connector cleaning tool.
Figure 25A:
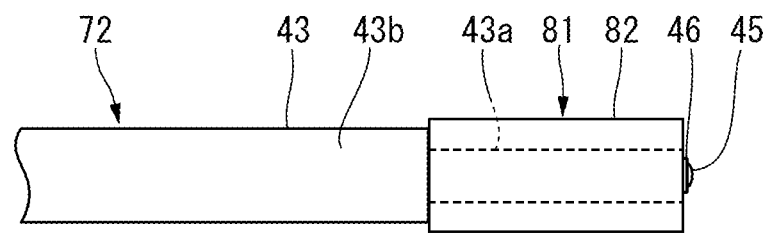
FIG. 25A is a side view showing the LC connector attachment attached to the optical connector cleaning tool.
Figure 25B:
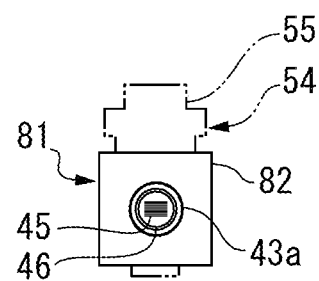
FIG. 25B is a front view showing the LC connector attachment attached to the optical connector cleaning tool.

As shown in FIG. 24, the attachment according to this embodiment can be formed in a shape that allows the attachment to be fitted in, for example, the LC connector. An attachment 81 according to this embodiment includes a fitting portion 82 matching part of an insertion port shape 55 of an LC connector adapter 54 (see FIG. 25B) and a through hole 83 into which the distal end portion 43*a* of the optical connector cleaning tool 72 is fitted. By inserting the attachment 81 into the LC connector adapter 54, the cleaning thread 45 is positioned to match with the LC connector ferrule.

According to this embodiment, the LC connector (not shown) inserted into the LC connector adapter 54 can be cleaned using the optical connector cleaning tool 72.

The fitting portion of the optical connector cleaning tool is formed as the attachment 71, so that the attachment 71 and the attachment 81 can be prepared for each connector shape. A plurality of types of compact dual core optical connectors can be cleaned with one optical connector cleaning tool 72 by changing the attachment.

EXPLANATION OF THE REFERENCE NUMERALS AND SIGNS

31 . . . CS connector (compact dual core optical connector), 32 . . . adapter (connection component), 34 . . . ferrule, 35 . . . connection end face, 36 . . . first hole, 37 . . . second hole, 41, 72 . . . optical connector cleaning tool, 44 . . . fitting portion, 45 . . . cleaning thread (cleaning medium), 54 . . . LC connector adapter, 61 . . . cap (connection component), 62 . . . cap main body, 63 . . . lid, 64 . . . hinge, 66 . . . first space, 67 . . . second space, 69 . . . communication hole, 71 . . . attachment, 73 . . . through hole, L . . . virtual straight line

The invention claimed is:

1. An optical connector cleaning tool comprising
a fitting portion configured to be fitted in a hole defined by a connection component, on one end side of which a compact dual core optical connector having two ferrules in a housing is fitted and on the other end side of which the hole is formed such that connection end faces of distal ends of the two ferrules are exposed in the hole, and
a cleaning medium projecting from the fitting portion to contact the connection end face of one of the two ferrules,
wherein the fitting portion is formed in a shape that allows the fitting portion to be fitted in the hole in a first posture and a second posture, the fist posture and the second posture being postures rotated 180° from each other around the center of a virtual straight line connecting the centers of the two ferrules when viewed from an axial direction of the two ferrules,
the cleaning medium contacts one of the two ferrules in a state in which the fitting portion is fitted in the hole in the first posture and contacts the other of the two ferrules in a state in which the fitting portion is fitted in the hole in the second posture,
the fitting portion is formed in a shape that allows the fitting portion to be accommodated in the hole in an entire range in a direction along which the two ferrules are aligned, and
a half of the fitting portion in the direction along which the two ferrules are aligned includes the cleaning medium that projects, and the other half of the fitting portion in the direction along which the two ferrules are aligned is formed in a shape that allows the fitting portion to be fitted in an adapter that is configured to connect a single core optical connector different from the compact dual core optical connector.

2. The optical connector cleaning tool according claim 1, wherein
the connection component is an adapter configured to connect the compact dual core optical connector and another compact dual core optical connector, and
the hole is formed in a shape which allows the compact dual core optical connector to be fitted in.

3. The optical connector cleaning tool according to claim 1, wherein
the connection component is a cap configured to protect the fitting portion and includes a cap main body detachably attached to the fitting portion and a lid connected to the cap main body via a hinge, and
the cap main body includes a first space formed on one end side of the cap main body and configured to accommodate the compact dual core optical connector in a fitted state, a second space formed by the hole open to the other end side and configured to accommodate the fitting portion, and two communication holes for inserting the two ferrules, the two communication holes configured to communicate the first space and the second space with each other.

4. The optical connector cleaning tool according to claim 3, wherein
a depth of the first space is larger than a length of the ferrule projecting from the housing of the compact dual core optical connector.

* * * * *